United States Patent
De Haan et al.

(10) Patent No.: US 7,136,107 B2
(45) Date of Patent: Nov. 14, 2006

(54) POST-PROCESSING OF INTERPOLATED IMAGES

(75) Inventors: Gerard De Haan, Eindhoven (NL); Erwin Ben Bellers, Fremont, CA (US)

(73) Assignee: Koninklijke Philips Electronics N. V., Eindhoven (NL)

( * ) Notice: Subject to any disclaimer, the term of this patent is extended or adjusted under 35 U.S.C. 154(b) by 581 days.

(21) Appl. No.: 10/639,421

(22) Filed: Aug. 5, 2003

(65) Prior Publication Data

US 2005/0030424 A1 Feb. 10, 2005

(51) Int. Cl.
*H04N 7/01* (2006.01)

(52) U.S. Cl. .................. 348/448; 348/458; 348/441

(58) Field of Classification Search ............ 348/458, 348/448, 441, 451–452; *H04N 7/01*
See application file for complete search history.

(56) References Cited

U.S. PATENT DOCUMENTS

| | | | | |
|---|---|---|---|---|
| 4,768,092 A | * | 8/1988 | Ishikawa | 348/458 |
| 4,985,764 A | * | 1/1991 | Sato | 348/448 |
| 5,093,721 A | * | 3/1992 | Rabii | 348/448 |
| 5,708,474 A | * | 1/1998 | Hong | 348/448 |
| 6,330,032 B1 | * | 12/2001 | Boehlke | 348/452 |

* cited by examiner

*Primary Examiner*—David Ometz
*Assistant Examiner*—Trang U. Tran

(57) ABSTRACT

An image conversion unit (100) for converting an input image into an output image includes a first computing device (104) for computing a first weighted sum of a first group of pixel values, the first group of pixel values corresponding to pixels of the input image; a second computing device (102) for computing a second weighted sum of a second group of interpolated values, the second group of interpolated values being computed by interpolation for spatial locations which are not present at the sampling grid of the input image; a combining device (106) for computing a third sum by combining the first weighted sum and the second weighted sum; and a clipping device (108) for clipping the third sum between a minimum value and a maximum value, the minimum value and the maximum value being derived from pixel values of the input image.

12 Claims, 5 Drawing Sheets

POST-PROCESSING OF INTERPOLATED IMAGES

BACKGROUND OF THE INVENTION

1. Field of the Invention

The invention relates to an image conversion unit for converting an input image into an output image.

The invention further relates to an image processing apparatus comprising:

receiving means for receiving a signal corresponding to a sequence of input images; and an image conversion unit for converting a first one of the input images into an output image.

The invention further relates to a method of converting an input image into an output image.

The invention further relates to a computer program product to be loaded by a computer arrangement, comprising instructions to convert an input image into an output image, the computer arrangement comprising processing means and a memory.

2. Description of the Related Art

Interlacing is the common video broadcast procedure for transmitting the odd or even numbered image lines alternately. De-interlacing attempts to restore the full vertical resolution, i.e., make odd and even lines available simultaneously for each image. For the conversion of interlaced video signals to progressively scanned signals, a variety of methods have been proposed over the last few decades. An introduction to de-interlacing can be found in the overview article "De-interlacing—An overview", by Gerard de Haan and Erwin Bellers in the Proceeding of the IEEE (1998).

The algorithms that offer the highest image quality adapt the interpolation to the maximum correlation found in either the spatial dimension (edge-dependent interpolation), or in the temporal dimension (motion-compensated interpolation). The currently most advanced methods apply both motion compensation and directional adaptation. A disadvantage of these methods is that they are prone to motion vector and/or edge-orientation errors. As a consequence, serious artifacts might occur.

SUMMARY OF THE INVENTION

It is an object of the invention to provide an image conversion unit of the kind described in the opening paragraph which is arranged to reduce the artifacts which are caused by interpolation of pixel values.

This object of the invention is achieved in that the image conversion unit comprises:

first computing means for computing a first weighted sum of a first group of pixel values, the first group of pixel values corresponding to pixels of the input image;

second computing means for computing a second weighted sum of a second group of interpolated values, the second group of interpolated values being computed by means of interpolation for spatial locations which are not present at the sampling grid of the input image, the second weighted sum being computed on basis of filter coefficients, the sum of filter coefficients being substantially equal to zero;

combining means for computing a third sum by combining the first weighted sum and the second weighted sum; and clipping means for clipping the third sum between a minimum value and a maximum value, the minimum value derived from a third group of pixel values of the input image and the maximum value derived from a fourth group of pixel values of the input image.

Preferably the first computing means corresponds to a low-pass filter. The second computing means corresponds to a high-pass filter, because the sum of the filter coefficients is equal to zero. The reduction of artifacts, i.e., adaptation of inappropriate interpolated values, is achieved by combining values which are derived by high-pass filtering of these interpolated values with other values which are derived by low-pass filtering of the original values of the input image. In other words, the low frequent part of the input image is added to an amplified version of the high-frequency part of the interpolated values. The amplification is the result of applying suitable filter coefficients. As a consequence of the proposed operations, no low-frequency artifacts can occur in the output image. Potential under- and over-shoots are eliminated by the clipping means.

Preferably, the third group of pixel values and the fourth group of pixel values are mutually equal. Typically, the third group of pixel values comprises less than 20 values belonging to pixels in a neighborhood of an interpolated value under consideration.

An embodiment of the image conversion according to the invention further comprises an interpolation unit for computing the interpolated values on the basis of further pixel values of a further input image. The interpolation unit might be a de-interlacing unit. Alternatively, the interpolation unit is a spatial up-conversion unit. Spatial up-conversion techniques, e.g., enable standard definition (SD) video material to be viewed on high definition (HD) television (TV) displays.

Additional to the conventional linear techniques, a number of non-linear algorithms have been proposed to achieve this up-conversion. Sometimes these techniques are referred to as content-based, content adaptive or edge dependent spatial up-conversion. A number of these up-conversion techniques have been described in an overview article "Towards an overview of spatial up-conversion techniques", by Meng Zhao et al., in the proceedings of the ISCE 2002, Erfurt, Germany, 23–26 September 2002.

Alternatively, the image conversion unit does not comprise the interpolation unit, e.g., de-interlacing unit or spatial up-conversion unit, but is connected to such interpolation unit and is arranged to perform the reduction of artifacts as a kind of post-processing.

In an embodiment of the image filter unit according to the invention, the filter coefficients of the second computing means are fixed, i.e., predetermined. These filter coefficients are determined such that an amplification of the high-frequency part of the interpolated values is achieved. Because of the clipping means, there is no risk of overshoot or undershoot. However, alternatively, the filter coefficients might be controllable. Hence, an embodiment of the image filter unit according to the invention comprises control means for controlling the filter coefficients on the basis of a control signal of the interpolation unit. An advantage of this embodiment according to the invention is an improved reduction of artifacts.

The quality of parameters which control the interpolation are related to the probability of artifacts. E.g., in the case of motion compensated de-interlacing, the correctness of the motion vectors is important for the quality of the progressive output image, i.e., the appropriateness of the interpolated pixel values. In that case, it is advantageous to apply knowledge about the quality of the motion vectors to control the filter coefficients. A parameter which represents the quality of a motion vector is the match error. A typical motion estimation unit is arranged to estimate the motion vector on the basis of a sum of differences between pixel values of a first image and further pixel values of a second image. The match error might be the Sum of Absolute Difference (SAD). A preferred motion estimation is specified in the article "True-Motion Estimation with 3-D Recursive Search Block Matching" by G. de Haan et. al. in IEEE Transactions on circuits and systems for video technology, vol.3, no.5, October 1993, pages 368–379.

In the case of edge-dependent interpolation, it is advantageous to apply knowledge about the quality of the estimated edges to control the filter coefficients.

In an embodiment of the image filter unit according to the invention, the minimum value is equal to a particular pixel value of the third group of pixel values having the minimum value. Alternatively, the minimum value is computed by averaging a number of pixel values of the third group which have relatively low values. The establishing of the maximum value is preferably based on a similar approach, albeit based on maximum values.

It is a further object of the invention to provide an image processing apparatus of the kind described in the opening paragraph which is arranged to reduce the artifacts which are caused by interpolation of pixel values.

This object of the invention is achieved in that the image conversion unit comprises:

first computing means for computing a first weighted sum of a first group of pixel values, the first group of pixel values corresponding to pixels of the input image;

second computing means for computing a second weighted sum of a second group of interpolated values, the second group of interpolated values being computed by means of interpolation for spatial locations which are not present at the sampling grid of the input image, the second weighted sum being computed on basis of filter coefficients, the sum of filter coefficients being substantially equal to zero;

combining means for computing a third sum by combining the first weighted sum and the second weighted sum; and clipping means for clipping the third sum between a minimum value and a maximum value, the minimum value derived from a third group of pixel values of the input image and the maximum value derived from a fourth group of pixel values of the input image.

The image processing apparatus optionally comprises a display device for displaying the second image. The image processing apparatus might, e.g., be a TV, a set-top box, a satellite tuner, a VCR (Video Cassette Recorder) player or a DVD (Digital Versatile Disk) player.

It is a further object of the invention to provide a method of the kind described in the opening paragraph with which the artifacts which are caused by interpolation of pixel values, are reduced.

This object of the invention is achieved in that the method comprises:

computing a first weighted sum of a first group of pixel values, the first group of pixel values corresponding to pixels of the input image;

computing a second weighted sum of a second group of interpolated values, the second group of interpolated values being computed by means of interpolation for spatial locations which are not present at the sampling grid of the input image, the second weighted sum being computed on basis of filter coefficients, the sum of filter coefficients being substantially equal to zero;

computing a third sum by combining the first weighted sum and the second weighted sum; and clipping the third sum between a minimum value and a maximum value, the minimum value derived from a third group of pixel values of the input image and the maximum value derived from a fourth group of pixel values of the input image.

It is a further object of the invention to provide a computer program product of the kind described in the opening paragraph with which the artifacts which are caused by interpolation of pixel values, are reduced.

This object of the invention is achieved in that the computer program product, after being loaded, provides said processing means with the capability to carry out:

computing a first weighted sum of a first group of pixel values, the first group of pixel values corresponding to pixels of the input image;

computing a second weighted sum of a second group of interpolated values, the second group of interpolated values being computed by means of interpolation for spatial locations which are not present at the sampling grid of the input image, the second weighted sum being computed on basis of filter coefficients, the sum of filter coefficients being substantially equal to zero;

computing a third sum by combining the first weighted sum and the second weighted sum; and clipping the third sum between a minimum value and a maximum value, the minimum value derived from a third group of pixel values of the input image and the maximum value derived from a fourth group of pixel values of the input image.

Modifications of the image conversion unit and variations thereof may correspond to modifications and variations thereof of the image processing apparatus, the method and the computer program product, being described.

BRIEF DESCRIPTION OF THE DRAWINGS

These and other aspects of the image conversion unit, of the image processing apparatus, of the method and of the computer program product, according to the invention will become apparent from and will be elucidated with respect to the implementations and embodiments described hereinafter and with reference to the accompanying drawings, wherein.

Same reference numerals are used to denote similar parts throughout the figures.

DESCRIPTION OF THE PREFERRED EMBODIMENTS

Figure 1A:
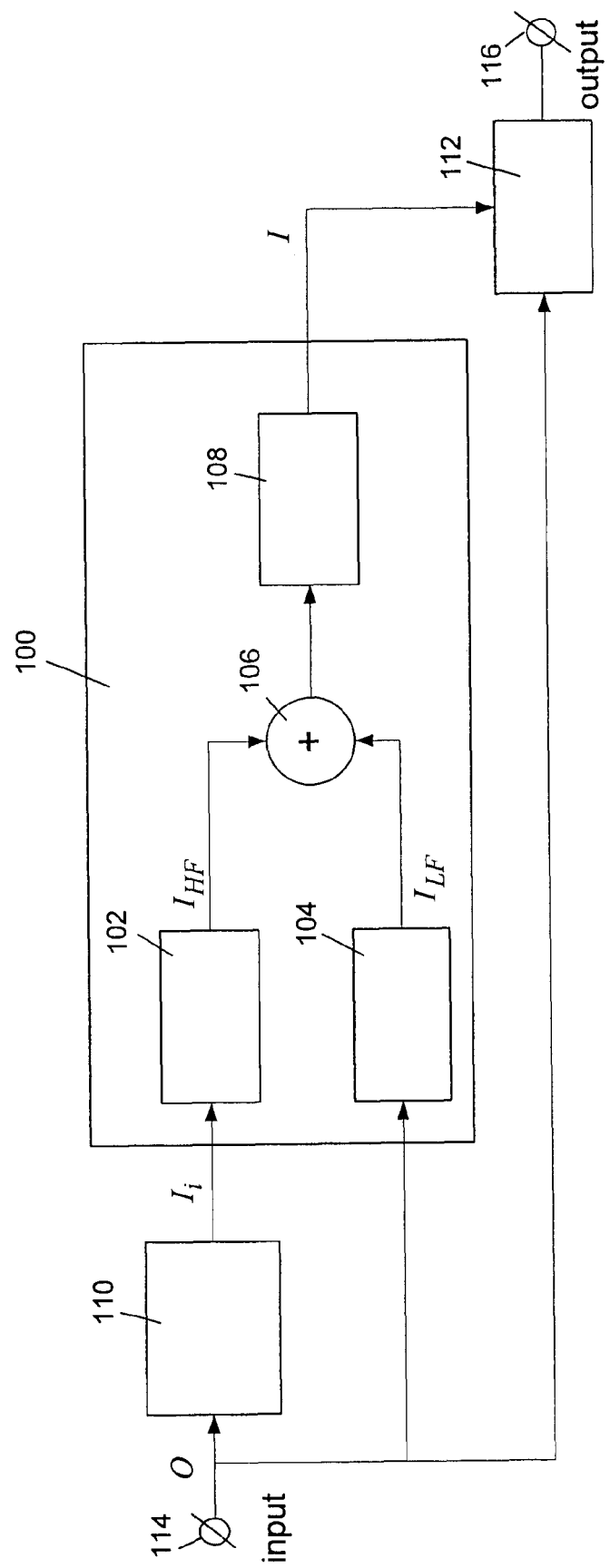
FIG. 1A schematically shows an embodiment of the image conversion unit according to the invention, in its context.

FIG. 1 schematically shows an embodiment of the image conversion unit 100 according to the invention in its context, i.e., the image conversion unit 100 is connected to a de-interlacing unit 110 and a merging unit 112. The de-interlacing unit is arranged to compute, for a particular video field, the values for the missing pixels. E.g., for a video field corresponding to the even lines of an image, the pixels values corresponding to the odd lines are missing, i.e., there are no pixel values for the corresponding spatial locations at the sampling grid of the input image. These missing pixel values are approximated by means of interpolation of pixel values of the current video field. That means, e.g., that pixel values taken from lines above and below the spatial position for which a value has to be computed, are used as input for interpolation. The actual pixel values taken might be based on a detected edge in the image. Preferably, also pixel values in a temporal environment are applied for the interpolation. Preferably, pixel values from a previous video field and motion vectors are used as input for that latter type of interpolation.

The merging unit 112 is arranged to construct an output image by means of combining the original pixel values, corresponding to either the odd or even video lines of an input image, with the values computed by the image conversion unit 100 corresponding to the even or odd video lines of the output image, respectively.

The image conversion unit 100 comprises:

a low-pass filter 104 for computing a first weighted sum of a first group of pixel values, the first group of pixel values corresponding to pixels of the input image;

a high-pass filter 102 for computing a second weighted sum of a second group of interpolated values;

an adding unit 106 for computing a third sum by combining the first weighted sum and the second weighted sum; and a clipping unit 108 for clipping the third sum between a minimum value and a maximum value.

The output $I_{LF}(y,n)$ of the low-pass filter 104 is specified in Equation 1:

$$I_{LF}(y,n)=1*O(y-3,n)+8*O(y-1,n)+8*O(y+1,n)+1*O(y+3,n) \quad (1)$$

where $O(y,n)$ is a sample from the originally available lines in the video signal, y indicates the vertical position, i.e., line-number in the progressive frame, i.e., the output image, and n indicates the image number. From Equation 1 can be derived that the low-pass filtering is based on the values of 4 pixels which are located above and below the pixel under consideration.

The output $I_{HF}(y,n)$ of the high-pass filter 102 is specified in Equation 2:

$$I_{HF}(y,n)=-5*I_i(y-2,n)+10*I_i(y,n)+-5*I_i(y+2,n) \quad (2)$$

where $I_i(y,n)$ is the interpolated sample obtained from the de-interlacing unit 110. From Equation 2, it can be derived that the high-pass filtering is based on 3 pixel values. The filtered value of a particular pixel is based on that particular pixel, a pixel which is located above that particular pixel and a pixel which is located below that particular pixel.

The output of the high-pass filter 102 and the output of the low-pass filter are connected to the adding unit 106 for computing a third sum by combining the first weighted sum and the second weighted sum.

The output of the adding unit 106 is connected to a clipping unit 108 for clipping the third sum between a minimum value and a maximum value. The minimum and maximum values are derived from a group of pixel values taken from the lines above and below the interpolated sample. Preferably, the pixels of the group do not deviate more in horizontal position than a predetermined distance, e.g., +/−3 samples in horizontal direction. The clipping operation of the clipping unit 108 is specified in Equation 3:

$$I(y,n)=\text{clip}(I_{LF}+I_{HF},\min,\max) \quad (3)$$

where $$\text{clip}(a, \min, \max) = \begin{cases} a & \text{if } \min < a < \max \\ \min & \text{if } a < \min \\ \max & \text{if } a > \max \end{cases} \quad (4)$$

The low-pass filter 104, the high-pass filter 102, the adding unit 106 and the clipping unit 108 may be implemented using one processor. Besides that, the image conversion unit 100, the de-interlacing unit 110 and the merging unit 112 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

Figure 1B:
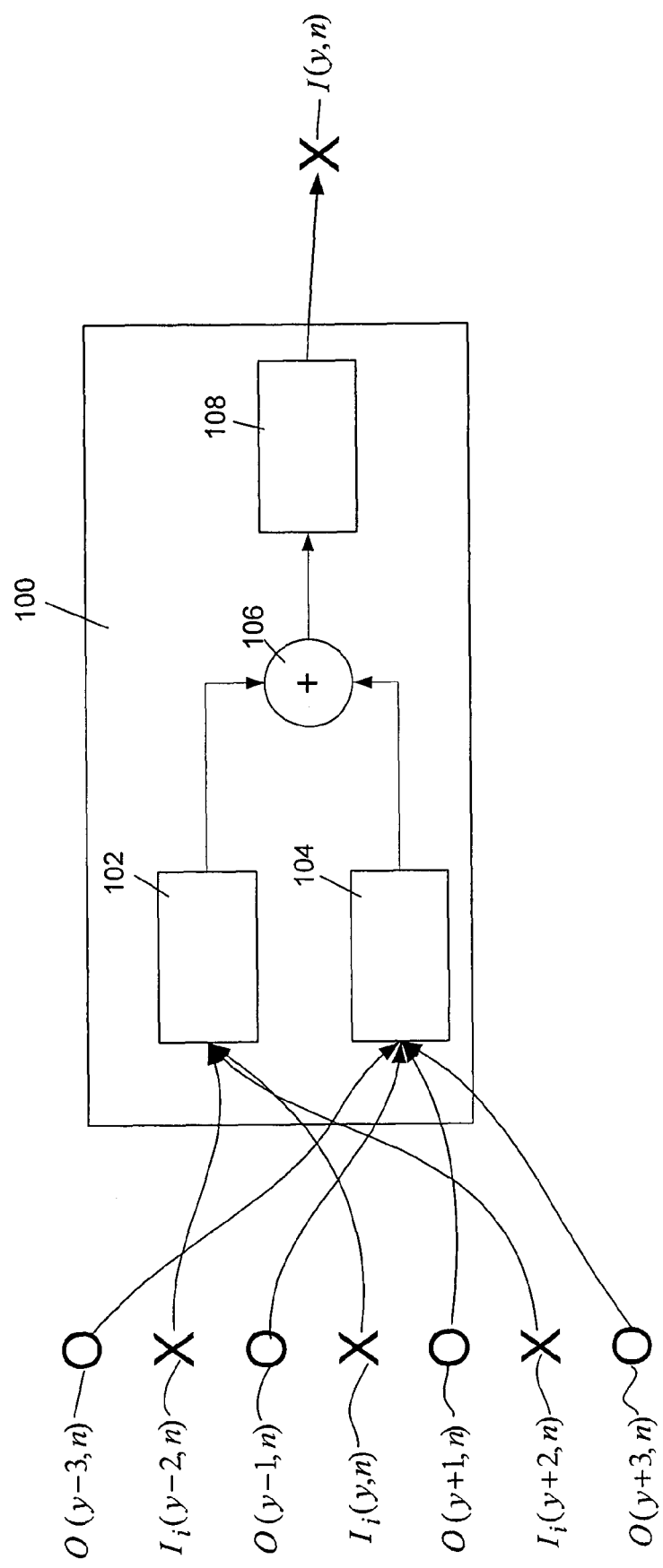
FIG. 1B schematically shows the image conversion unit of FIG. 1A with a number of input and output samples.

FIG. 1B schematically shows the image conversion unit of FIG. 1A with a number of input and output samples. A particular output sample I(y,n) is computed on basis of a weighted sum of 7 input samples. Optionally, depending on its value, the output sample is clipped on basis of further input samples, e.g. input samples from the set comprising O(x−2,y+1,n), O(x−1,y+1,n), O(x,y+1,n), O(x+1,y+1,n), O(x+2,y+1,n), O(x−2,y−1,n), O(x−1,y−1,n), O(x,y−1,n), O(x+1,y−1,n) and O(x+2,y−1,n).

The image conversion unit 100 described in connection with FIGS. 1A and 1B is connected to a de-interlacing unit 110 and is arranged to perform a one-dimensional filtering in the vertical direction. It will be clear that an alternative embodiment according to the invention is arranged to perform a one-dimensional filtering in the horizontal direction, and that a further embodiment according to the invention is arranged to perform a two-dimensional filtering in both the horizontal direction and the vertical direction. The latter embodiment might be applied in combination with a spatial up-conversion unit being arranged to convert an input image into an output image having a higher spatial resolution.

Figure 2:
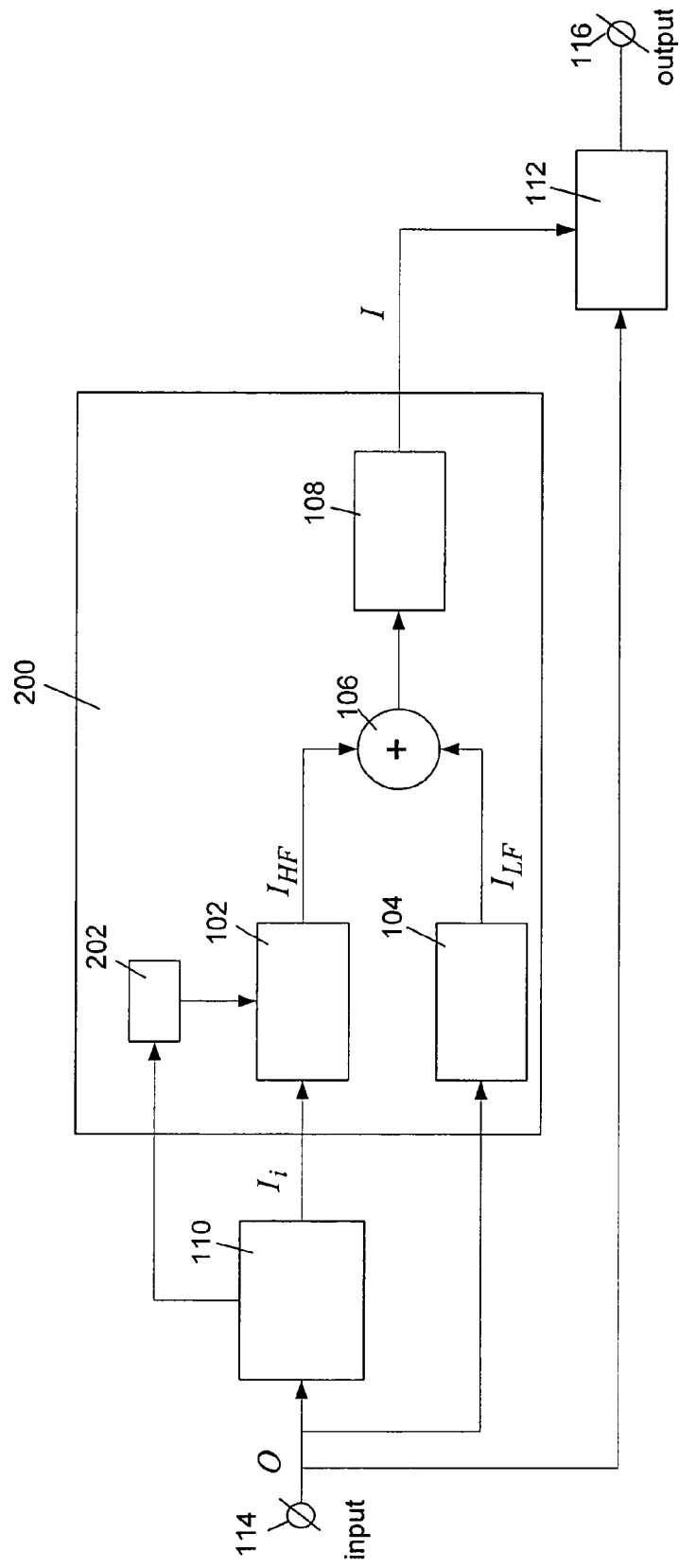
FIG. 2 schematically shows an embodiment of the image conversion unit according to the invention, comprising a control unit for controlling the high-pass filter.

FIG. 2 schematically shows an embodiment of the image conversion unit 200 according to the invention, comprising a control unit 202 for controlling the high-pass filter 102. The control unit 202 is arranged to compute filter coefficients for the high-pass filter 102 on the basis of a control signal provided by an interpolation unit, e.g., the de-interlacing unit 110. The control signal might be derived from the estimation of motion vectors or the estimation of edges in the image. The control unit 202, the low-pass filter 104, the high-pass filter 102, the adding unit 106 and the clipping unit 108 may be implemented using one processor.

Figure 3:
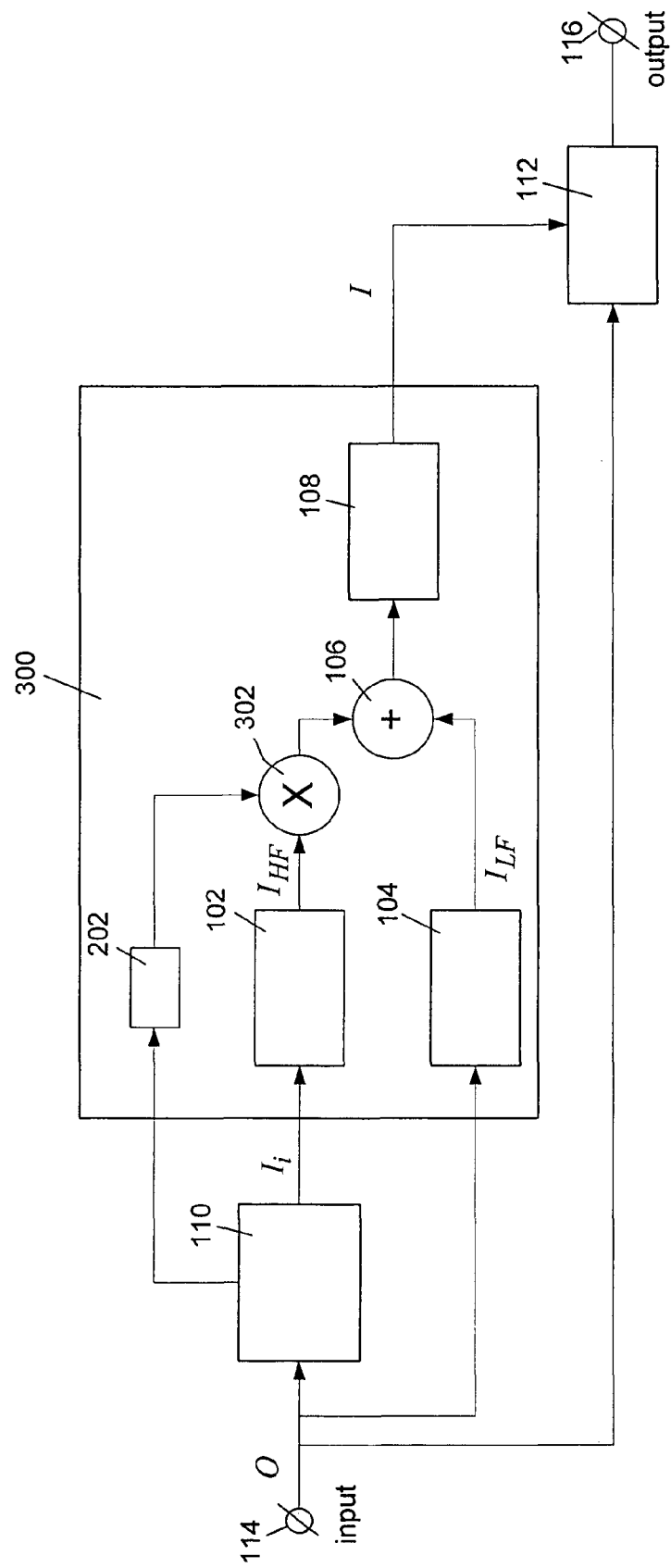
FIG. 3 schematically shows an alternative embodiment of the image conversion unit according to the invention, comprising a multiplication unit.

FIG. 3 schematically shows an alternative embodiment of the image conversion unit 300 according to the invention, comprising a multiplication unit 302. The multiplication unit 302 is arranged to multiply the high-pass filtered signal $I_{HF}(Y,n)$ with a gain which is provided by the control unit 202. It should be noted that by adjustment of the filter coefficients for the high-pass filter 102, as described in connection with FIG. 2, the same effect can be achieved as by means of adjustment of this gain. The multiplication unit 302, the control unit 202, the low-pass filter 104, the high-pass filter 102, the adding unit 106 and the clipping unit 108 may be implemented using one processor.

Figure 4:
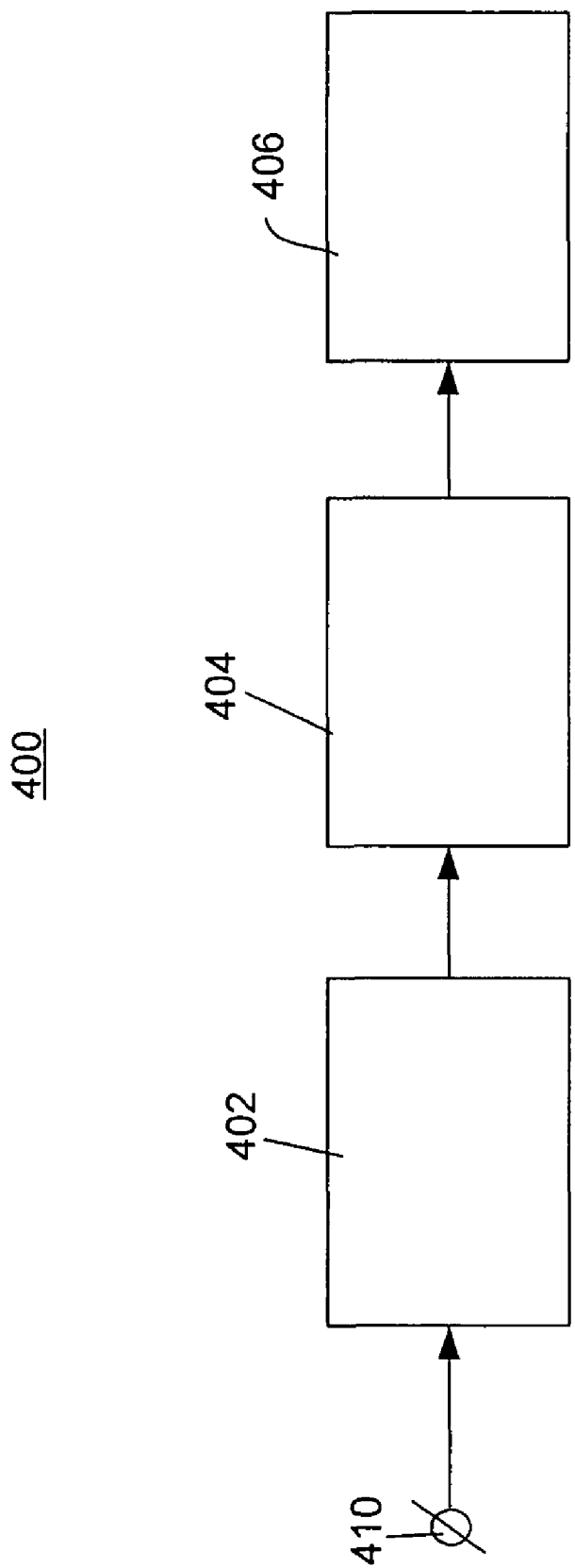
FIG. 4 schematically shows an embodiment of the image processing apparatus according to the invention.

FIG. 4 schematically shows an embodiment of the image processing apparatus 400 according to the invention, comprising:

receiving means 402 for receiving a signal representing SD images;

the combination 404 of image processing components 110, 112, 100, 200, 300 as described in connection with any of the FIGS. 1A, 1B, 2 and 3, respectively; and a display device 406 for displaying the HD output images of the combination 404 of image processing components. This display device 406 is optional.

The signal may be a broadcast signal received via an antenna or cable, but may also be a signal from a storage device like a VCR (Video Cassette Recorder) or Digital Versatile Disk (DVD). The signal is provided at the input connector 408. The image processing apparatus 400 might, e.g., be a TV. Alternatively, the image processing apparatus 400 does not comprise the optional display device but provides HD images to an apparatus that does comprise a display device 406. Then, the image processing apparatus 400 might be, e.g., a set-top box, a satellite-tuner, a VCR player or a DVD player. But it might also be a system being applied by a film-studio or broadcaster.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. An image conversion unit for converting an interlaced input image into a de-interlaced output image, the image conversion unit comprising:
   an input for receiving an input image signal, said input image signal including a sequence of odd numbered lines containing pixels followed by a sequence of even numbered lines containing pixels, said even numbered lines spatially intervening with said odd numbered lines;
   first computing means for computing a first weighted sum of a first group of pixel values, the first group of pixel values corresponding to pixels of the input image;
   second computing means for computing a second weighted sum of a second group of interpolated values, the second group of interpolated values being computed by interpolation for spatial locations which are not present in the sampling grid of the input image, the second weighted sum being computed based on filter coefficients, the sum of filter coefficients being substantially equal to zero;
   combining means for computing a third sum by combining the first weighted sum and the second weighted sum;
   clipping means for clipping the third sum between a minimum value and a maximum value, the minimum value derived from a third group of pixel values of the input image and the maximum value derived from a fourth group of pixel values of the input image; and
   an output coupled to said clipping means for providing an output image signal corresponding to the input image signal with interpolated intervening pixels.

2. The image conversion unit as claimed in claim 1, wherein said image conversion unit further comprises:
   an interpolation unit for computing the interpolated values based on further pixel values of a further input image.

3. The image conversion unit as claimed in claim 2, wherein the interpolation unit is a de-interlacing unit.

4. The image conversion unit as claimed in claim 2, wherein the interpolation unit is a spatial up-conversion unit.

5. The image conversion unit as claimed in claim 2, wherein said image conversion unit further comprises:
   control means for controlling the filter coefficients based on a control signal of the interpolation unit.

6. The image conversion unit as claimed in claim 5, wherein the interpolation unit computes the interpolated values based on motion vectors, and the control signal is based on the motion vectors.

7. The image conversion unit as claimed in claim 1, wherein the minimum value is equal to a particular pixel value of the third group of pixel values having the minimum value.

8. An image processing apparatus comprising:
   receiving means for receiving a signal corresponding to a sequence of input images; and
   the image conversion unit as claimed in claim 2, for converting the input images into output images.

9. The image processing apparatus as claimed in claim 8, characterized in that said image processing apparatus further comprises a display device for displaying the output images.

10. The image processing apparatus as claimed in claim 9, characterized in that said image processing apparatus comprises a television receiver.

11. A method of converting an input image into an output image, the method comprising the steps of:
    receiving an input image signal, said input image signal including a sequence of odd numbered lines containing pixels followed by a sequence of even numbered lines containing pixels, said even numbered lines spatially intervening with said odd numbered lines;
    computing a first weighted sum of a first group of pixel values, the first group of pixel values corresponding to pixels of the input image;
    computing a second weighted sum of a second group of interpolated values, the second group of interpolated values being computed by means of interpolation for spatial locations which are not present in the sampling grid of the input image, the second weighted sum being computed based on filter coefficients, the sum of filter coefficients being substantially equal to zero;
    computing a third sum by combining the first weighted sum and the second weighted sum;
    clipping the third sum between a minimum value and a maximum value, the minimum value derived from a third group of pixel values of the input image and the maximum value derived from a fourth group of pixel values of the input image; and
    providing an output image signal, in dependence on the clipped third sum, corresponding to the input image signal with interpolated intervening pixels.

12. A computer-readable medium having instructions stored therein to be loaded by a computer arrangement, said instructions causing said computer arrangement to convert an input image into an output image, the arrangement comprising processing means and a memory, the instructions, after being loaded, causing said processing means to carry out:
    receiving an input image signal, said input image signal including a sequence of odd numbered lines containing pixels followed by a sequence of even numbered lines containing pixels, said even numbered lines spatially intervening with said odd numbered lines;
    computing a first weighted sum of a first group of pixel values, the first group of pixel values corresponding to pixels of the input image;
    computing a second weighted sum of a second group of interpolated values, the second group of interpolated values being computed by means of interpolation for spatial locations which are not present at the sampling grid of the input image, the second weighted sum being computed based filter coefficients, the sum of filter coefficients being substantially equal to zero;
    computing a third sum by combining the first weighted sum and the second weighted sum;
    clipping the third sum between a minimum value and a maximum value, the minimum value derived from a third group of pixel values of the input image and the maximum value derived from a fourth group of pixel values of the input image; and
    providing an output image signal, in dependence on the clipped third sum, corresponding to the input image signal with interpolated intervening pixels.

* * * * *